United States Patent
Ren et al.

(10) Patent No.: US 12,420,621 B2
(45) Date of Patent: Sep. 23, 2025

(54) COAXIAL ASYNCHRONOUS ELECTRIC DRIVE SYSTEM

(71) Applicant: XPT (NANJING) E-POWERTRAIN TECHNOLOGY CO., LTD., Jiangsu (CN)

(72) Inventors: Chuanwei Ren, Shandong (CN); Lu Bi, Shanghai (CN); Huaiyuan Liu, Hunan (CN)

(73) Assignee: XPT (NANJING) E-POWERTRAIN TECHNOLOGY CO., LTD., Jiangsui (CN)

( * ) Notice: Subject to any disclaimer, the term of this patent is extended or adjusted under 35 U.S.C. 154(b) by 0 days.

(21) Appl. No.: 18/041,088

(22) PCT Filed: Aug. 12, 2020

(86) PCT No.: PCT/CN2020/108639
§ 371 (c)(1),
(2) Date: Feb. 9, 2023

(87) PCT Pub. No.: WO2022/032520
PCT Pub. Date: Feb. 17, 2022

(65) Prior Publication Data
US 2023/0302886 A1    Sep. 28, 2023

(51) Int. Cl.
*B60K 1/00* (2006.01)
*B60K 17/16* (2006.01)
(Continued)

(52) U.S. Cl.
CPC .............. *B60K 1/00* (2013.01); *B60K 17/165* (2013.01); *F16H 37/0813* (2013.01);
(Continued)

(58) Field of Classification Search
CPC ...... B60K 1/00; B60K 17/165; B60K 17/356; B60K 2001/001; F16H 37/0813;
(Continued)

(56) References Cited

U.S. PATENT DOCUMENTS

2009/0127954 A1   5/2009  Mogi
2012/0031691 A1*   2/2012  Fuechtner ................ B60K 1/00
                                                                                                                       180/65.6
(Continued)

FOREIGN PATENT DOCUMENTS

CN         203823013 U  *  9/2014  ............ F16H 57/02
CN         105790500        7/2016
(Continued)

OTHER PUBLICATIONS

International Search Report and Written Opinion for International (PCT) Patent Application No. PCT/CN2020/108639, dated Apr. 22, 2021, 6 pages.

(Continued)

*Primary Examiner* — Tisha D Lewis
(74) *Attorney, Agent, or Firm* — Sheridan Ross P.C.

(57) ABSTRACT

A coaxial asynchronous motor drive system, including a speed reducer, an electric motor and a main housing, and further including a motor controller, wherein the electric motor and the speed reducer are connected to form a motor reducer assembly and mounted inside the main housing, and the motor controller is fixed to the main housing and connected to the motor reducer assembly. The system reduces parasitic loss of an auxiliary motor drive system of a battery electric four-wheel-drive vehicle and increases the range per charge of the vehicle, and the compact and integrated coaxial motor drive system facilitates maximum utilization of available space of the vehicle.

16 Claims, 4 Drawing Sheets

(51) Int. Cl.
| | |
|---|---|
| *F16H 37/08* | (2006.01) |
| *F16H 57/021* | (2012.01) |
| *F16H 57/025* | (2012.01) |
| *F16H 57/029* | (2012.01) |
| *F16H 57/037* | (2012.01) |
| *H02K 7/08* | (2006.01) |
| *H02K 7/116* | (2006.01) |
| *H02K 17/32* | (2006.01) |
| *B60K 17/356* | (2006.01) |
| *F16H 57/02* | (2012.01) |

(52) U.S. Cl.
CPC ......... *F16H 57/021* (2013.01); *F16H 57/025* (2013.01); *F16H 57/029* (2013.01); *F16H 57/037* (2013.01); *H02K 7/083* (2013.01); *H02K 7/116* (2013.01); *H02K 17/32* (2013.01); *B60K 2001/001* (2013.01); *B60K 17/356* (2013.01); *F16H 2057/02026* (2013.01); *F16H 2057/02034* (2013.01); *F16H 2057/02052* (2013.01)

(58) Field of Classification Search
CPC .... F16H 57/021; F16H 57/025; F16H 57/029; F16H 57/037; F16H 2057/02026; F16H 2057/02034; F16H 2057/02052; H02K 7/083; H02K 7/116; H02K 17/32
See application file for complete search history.

(56) References Cited

U.S. PATENT DOCUMENTS

| | | | |
|---|---|---|---|
| 2015/0333602 A1 | 11/2015 | Mohr | |
| 2017/0023114 A1* | 1/2017 | Wang | B60K 1/00 |
| 2018/0076687 A1* | 3/2018 | Pritchard | H02K 11/33 |
| 2019/0123619 A1 | 4/2019 | Sakurada | |
| 2019/0154149 A1* | 5/2019 | Gruber | B60K 1/00 |
| 2019/0260269 A1 | 8/2019 | Francis et al. | |
| 2019/0353208 A1* | 11/2019 | Dmytryszyn | B60K 17/22 |
| 2020/0254870 A1* | 8/2020 | Zhang | B60B 35/14 |

FOREIGN PATENT DOCUMENTS

| | | | | |
|---|---|---|---|---|
| CN | 107128171 | | 9/2017 | |
| CN | 108110960 | | 6/2018 | |
| CN | 207683334 | | 8/2018 | |
| CN | 108790754 | | 11/2018 | |
| CN | 109109640 | | 1/2019 | |
| CN | 109435660 | | 3/2019 | |
| CN | 208585075 U | * | 3/2019 | ............... B60K 1/00 |
| CN | 109878312 | | 6/2019 | |
| CN | 109955702 A | * | 7/2019 | ............... B60K 1/00 |
| CN | 110829707 | | 2/2020 | |
| JP | 09123774 A | * | 5/1997 | ............. B60K 17/22 |
| JP | 2000-355227 | | 12/2000 | |
| JP | 2015-061416 | | 3/2015 | |
| WO | WO 2019/042387 | | 3/2019 | |
| WO | WO 2019/216043 | | 11/2019 | |
| WO | WO 2019/228639 | | 12/2019 | |
| WO | WO 2020/067273 | | 4/2020 | |

OTHER PUBLICATIONS

Extended Search Report for European Patent Application No. 20949019.2, dated Apr. 15, 2024, 11 pages.
Official Action with Machine Translation for Chin Patent Application No. 202080104171.2, dated May 28, 2025, 15 pages.

* cited by examiner

COAXIAL ASYNCHRONOUS ELECTRIC DRIVE SYSTEM

CROSS REFERENCE TO RELATED APPLICATIONS

This application is a national stage application under 35 U.S.C. 371 and claims the benefit of PCT Application No. PCT/CN2020/108639 having an international filing date of 12 Aug. 2020, which designated the United States, the disclosure of which is incorporated herein by reference in its entirety.

TECHNICAL FIELD

The disclosure relates to the field of electric vehicles, and in particular to a coaxial asynchronous motor drive system.

BACKGROUND ART

Climate change and energy and environment issues are long-term challenges that human society faces together. As the United States said it will be back to attend the 15$^{th}$ Conference of the Parties (COP15) to the United Nations Framework Convention on Climate Change, emerging countries including China and India as representatives have accession to the convention and major countries actively implement energy and environmental protection strategies, the world has entered an era of truly addressing the common issues of human society. Effectively solving the three major issues of greenhouse gas emission, energy consumption and exhaust emission in the field of transportation has direct influences on solving the common issues of human beings. To this end, governments, organizations, vehicle manufacturers, energy suppliers and venture capital enterprises of major countries in the world act together to promote the upgrading of an industrial structure of the global auto industry and the strategic transformation of power systems toward electrification, promote the formation of social basic industries of electric vehicles having multi-level structures and the formulation of corresponding policies, promote the construction of a security system, and support the formation of a sustainable electric vehicle society.

As a country with huge energy consumption in the world and a major force of environmental protection, China has actively implemented the scientific and technological strategy of electric vehicles, promoted the upgrading of the industrial structure of the vehicle industry and the electric transformation of the power system, fostered and developed the electric vehicle society, and achieved certain effects. Reducing the greenhouse gas emission in the field of transportation is an important means to solve the global climate change and a prerequisite for building the sustainable electric vehicle society. Electric vehicles have no exhaust that will be produced by internal combustion engines in operation and as such do not cause exhaust pollution, which is beneficial to environmental protection and air cleanliness, and are almost "pollution-free". In addition, the application of electric vehicles can effectively reduce the dependence on petroleum resources, and thus the limited petroleum resources can be used for more important aspects.

At present, battery electric four-wheel-drive vehicles, P4-type electric bridge four-wheel-drive hybrid vehicles, etc. mostly use permanent magnet synchronous motors. However, in most cases, especially in high-speed cruising, a permanent magnet auxiliary drive system does not output torque but needs to consume energy to achieve zero-torque control, which will reduce the distance per charge of the vehicle. At present, most motor drive systems use a parallel-shaft speed reducer. Such speed reducer has a simple structure, but has a large size, especially in a vehicle length direction, which facilitates maximum utilization of available space of the vehicle.

SUMMARY OF THE DISCLOSURE

Objective of the disclosure: In order to solve the defects of the prior art, the disclosure provides a coaxial asynchronous motor drive system which can improve the range per charge of a vehicle and has a compact structure.

Technical Solution: In order to achieve the above objective, the disclosure provides a coaxial asynchronous motor drive system, comprising: a speed reducer, an electric motor and a main housing, and further comprising a motor controller, wherein the electric motor and the speed reducer are connected to form a motor reducer assembly and mounted inside the main housing, and the motor controller is fixed to the main housing and connected to the motor reducer assembly;

an input shaft and an output shaft of the speed reducer are in a line, and a speed reducer input gear is provided on a hollow motor shaft of the electric motor; and the electric motor controller controls to drive the gear on the hollow motor shaft of the electric motor to mesh with an intermediate shaft assembly to transfer a torque to an integral differential, and the torque is output to two sides via the integral differential, with a differential axle shaft gear spline on one side thereof being connected to a vehicle axle shaft, and a differential axle shaft gear spline on the other side thereof being connected to a short axle shaft which passes through a motor rotor and which is provided with a spline and a retaining ring at a motor exposed end for connection to a vehicle axle shaft internal spline.

As a further preferred solution of the disclosure, the intermediate shaft assembly is supported on a gearbox casing cover and a main housing assembly by means of a first intermediate shaft cone bearing and a second intermediate shaft cone bearing, respectively.

As a further preferred solution of the disclosure, the differential axle shaft gear spline is connected to a motor-side short axle shaft.

As a further preferred solution of the disclosure, the motor-side short axle shaft is rotatably sealed against a high-speed oil seal, an outer ring of the high-speed oil seal is sealed against the hollow motor shaft in an interference-fit manner, the oil seal rotates together with the motor shaft, and an inner side of the oil seal is rotatably sealed against the motor-side short axle shaft.

As a further preferred solution of the disclosure, the motor-side short axle shaft is supported on a motor-side short axle shaft bearing block by means of a motor-side short axle shaft support bearing.

As a further preferred solution of the disclosure, the main housing is provided with a rear suspension screw set, a front suspension screw set, a motor-side front suspension screw set, and a motor-side rear suspension screw set.

As a further preferred solution of the disclosure, the rear suspension screw set is configured to mount a gearbox-side proximal differential suspension bracket of the system.

As a further preferred solution of the disclosure, the front suspension screw set is configured to mount a gearbox-side distal differential suspension bracket of the system.

As a further preferred solution of the disclosure, the side front suspension screw set is configured to mount a motor-side front suspension bracket of the system.

As a further preferred solution of the disclosure, the motor-side rear suspension screw set is configured to mount a motor-side rear suspension bracket of the system.

As a further preferred solution of the disclosure, a water inlet nozzle of the motor controller located on the main housing and a motor water outlet nozzle are on the same side.

As a further preferred solution of the disclosure, in the motor controller, a motor controller-side three-phase copper bar and a motor controller-side temperature and rotary transformer signal and interface are exposed from a sealed housing of the motor controller, and the motor controller is mounted on the motor reducer assembly by means of four fixing bolts on a motor rear end cover.

As a further preferred solution of the disclosure, the distance between the top of the motor controller and the center of a circle of a gearbox-side output end is not more than 210 mm, which has a direct influence on an available space above a vehicle EDS.

As a further preferred solution of the disclosure, the distance between the center of a circle of the gearbox-side output end and the bottom of the main housing is not more than 143 mm, which has a direct influence on the ground clearance of a vehicle.

As a further preferred solution of the disclosure, the distance between the center of a circle of the gearbox-side output end and an end of the main housing in a forward direction is not more than 188 mm, which occupies the dimension of a front suspension space of the vehicle, and a smaller L31 is more conducive to the integration of a larger front trunk in the vehicle.

As a further preferred solution of the disclosure, the distance between the center of a circle of the gearbox-side output end and an end of the main housing in a direction opposite to the forward direction is not more than 143 mm, which occupies the dimension of the length between two axles of the vehicle and has a direct influence on the length dimension setting of a battery pack.

As a further preferred solution of the disclosure, the distance between the center of a circle of the gearbox-side output end and the motor-side output end is not more than 520 mm, which occupies the limited dimension between two driving wheels of the vehicle and has a direct influence on the length of the axle shafts on two sides, the longer dimension leads to a shorter axle shaft, and the excessively short axle shaft will have a direct influence on the service life of a universal joint, even causing the NVH performance to exceed the ultimate range of motion.

Beneficial effects: Compared to the prior art, the coaxial asynchronous motor drive system provided by the disclosure has the following advantages:
1. The parasitic loss of an auxiliary motor drive system of a battery electric four-wheel-drive vehicle is reduced, and the range per charge of the vehicle is increased; and
2. the compact and integrated coaxial motor drive system facilitates maximum utilization of available space of the vehicle.

Figure 1:
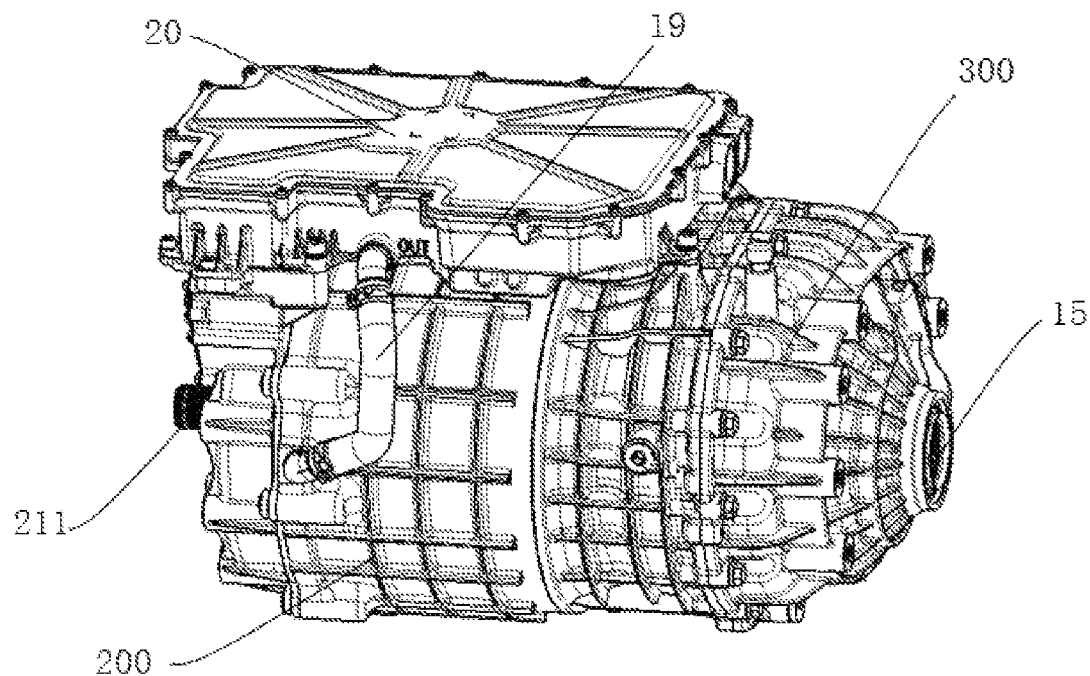
FIG. 1 is a cross-sectional view of a power transmission path of the disclosure.

In the figures, the list of reference numerals is as follows:
1 Motor rear end cover
2 Main housing
3 Motor water channel shell
4 Stator assembly
5 Cast-aluminum rotor
6 Hollow motor shaft
8 High-speed bearing
9 Differential carrier
12 Integral differential
13 Gearbox casing cover
15 Gearbox-side output oil seal
17 Intermediate shaft assembly
19 Motor controller water inlet
20 Motor controller
21 Motor-side short axle shaft
22 Motor-side output oil seal
23 Motor-side short axle shaft support bearing
24 Motor-side short axle shaft bearing block
25 Rotary transformer assembly
26 Motor rear end high-speed bearing
61 Gear on the hollow motor shaft
171 Intermediate shaft assembly primary driven gear
172 Intermediate shaft assembly secondary driving gear
200 Electric motor
211 External spline and retaining ring on an exposed end of the motor-side short axle shaft
300 Speed reducer
2011 Motor controller-side three-phase copper bar
2012 Motor controller-side temperature and rotary transformer signal and interface
2015 Three-phase copper bar of the electric motor
2018 Motor rear end cover
7 High-speed oil seal A
11 Differential cone bearing A
16 First intermediate shaft cone bearing A
M1 Rear suspension screw set A
M2 Front suspension screw set B
M3 Motor-side front suspension screw set C
M4 Motor-side rear suspension screw set D
10 High-speed oil seal B
14 Differential cone bearing B
18 Second intermediate shaft cone bearing B
W1 End face friction stir welding seam
W2 Annular friction stir welding
Y1 Water inlet nozzle
Y2 Water outlet nozzle
B1 Bolt A
B2 Bolt B
B3 Bolt C
B4 Bolt D

DETAILED DESCRIPTION OF EMBODIMENTS

The disclosure will be further illustrated below with reference to the drawings and specific embodiments.

In a coaxial asynchronous motor drive system of the disclosure, as shown in FIG. 1, an electric motor 200 and a speed reducer 300 are connected to form a motor reducer assembly and are mounted inside a main housing 2, and a motor controller 20 is fixed to the main housing 2 by means of bolts and is connected to the motor reducer assembly.

Figure 2:
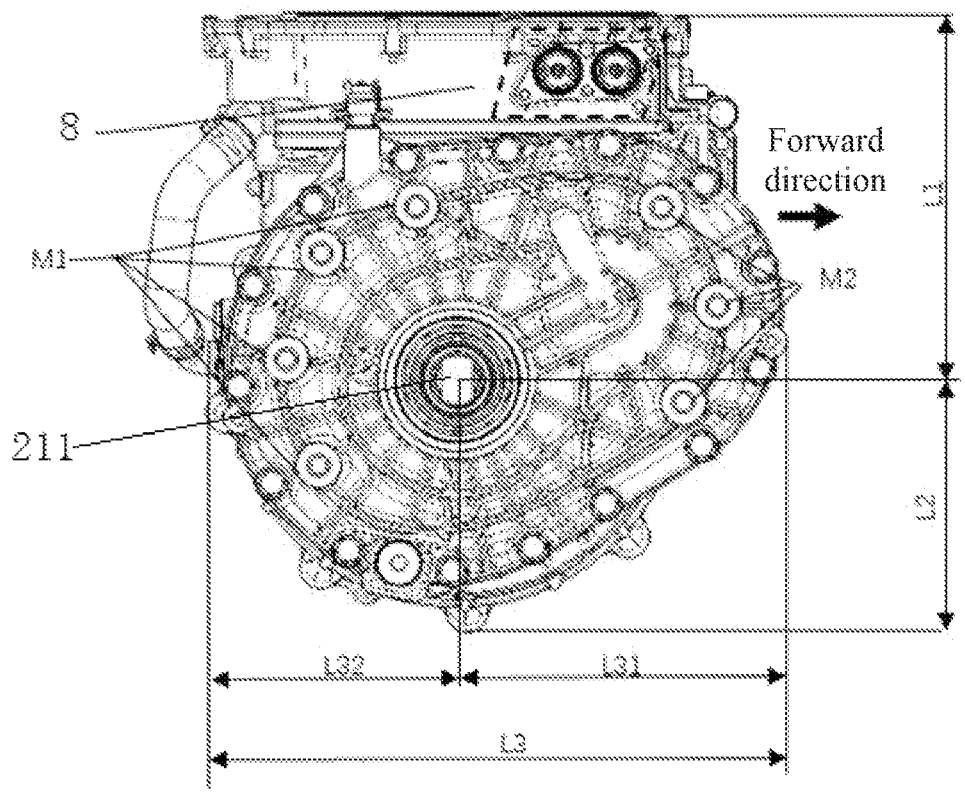
FIG. 2 is a schematic structural diagram of the disclosure after assembly.
Figure 3:
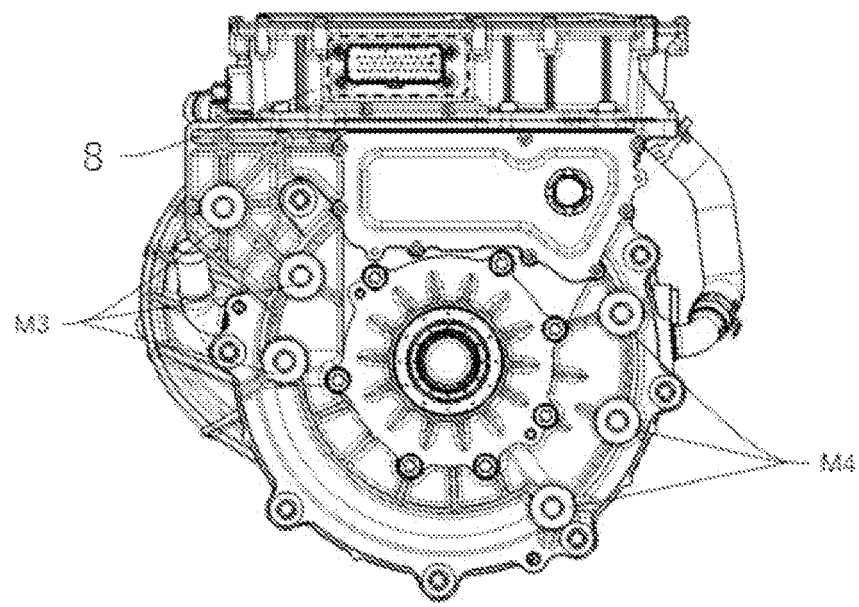
FIG. 3 is a front view of the disclosure.

As shown in FIGS. 2 and 3, the main housing is provided with a rear suspension screw set A M1, a front suspension screw set B_M2, a motor-side front suspension screw set C_M3, and a motor-side rear suspension screw set D_M4. The rear suspension screw set A M1 is configured to mount a gearbox-side proximal differential suspension bracket of the system, the front suspension screw set B_M2 is configured to mount a gearbox-side distal differential suspension bracket of the system, the front suspension screw set C_M3 is configured to mount a motor-side front suspension bracket of the system, and the motor-side rear suspension screw set D_M4 is configured to mount a motor-side rear suspension bracket of the system.

Figure 4:
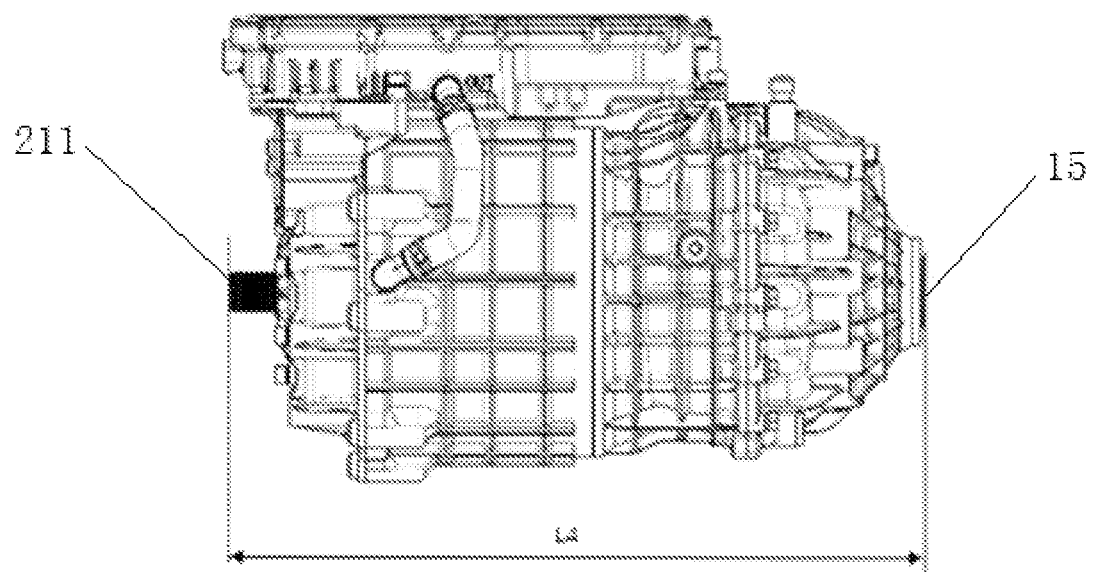
FIG. 4 is a rear view of the disclosure.

As shown in FIGS. 2, 3 and 4, the distance between the top of the motor controller and the center of a circle of a gearbox-side output end is not more than 210 mm, which has a direct influence on an available space above a vehicle EDS; the distance between the center of a circle of the gearbox-side output end and the bottom of the main housing is not more than 143 mm, which has a direct influence on the ground clearance of a vehicle; the distance between the center of a circle of the gearbox-side output end and an end of the main housing in a forward direction is not more than 188 mm, which occupies the dimension of a front suspension space of the vehicle, and a smaller L31 is more conducive to the integration of a larger front trunk in the vehicle; the distance between the center of a circle of the gearbox-side output end and an end of the main housing in a direction opposite to the forward direction is not more than 143 mm, which occupies the dimension of the length between two axles of the vehicle and has a direct influence on the length dimension setting of a battery pack; and the distance between the center of a circle of the gearbox-side output end and the motor-side output end is not more than 520 mm, which occupies the limited dimension between two driving wheels of the vehicle and has a direct influence on the length of the axle shafts on two sides, the longer dimension leads to a shorter axle shaft, and the excessively short axle shaft will have a direct influence on the service life of a universal joint, even causing the NVH performance to exceed the ultimate range of motion.

Figure 5:
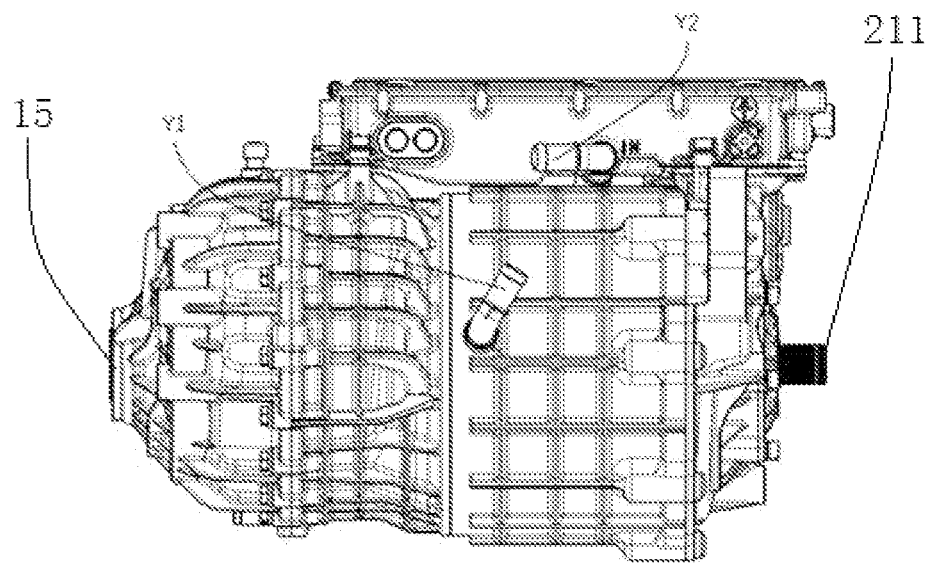
FIG. 5 is a left side view of the disclosure.

As shown in FIG. 5, a water inlet nozzle Y1 of the motor controller 20 located on the main housing 2 and a motor water outlet nozzle Y2 are on the same side.

Figure 6:
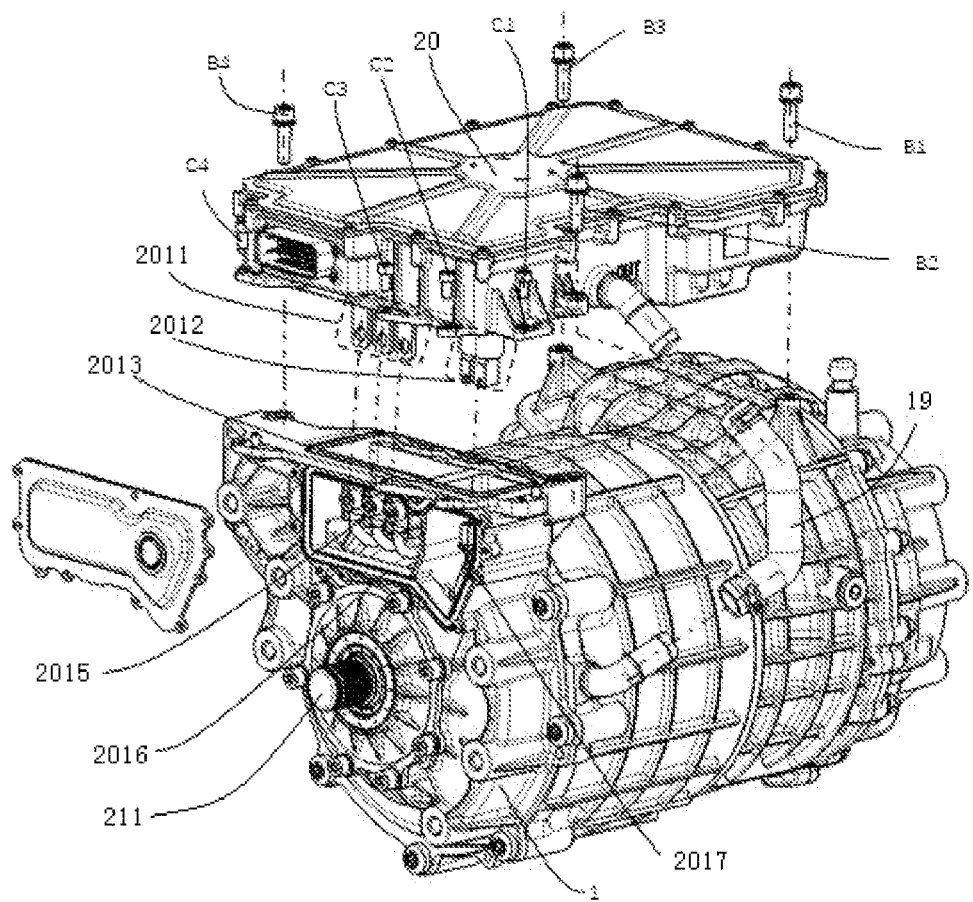
FIG. 6 is a right side view of the disclosure.

As shown in FIG. 6, in the motor controller 20, a motor controller-side three-phase copper bar 2011 and a motor controller-side temperature and rotary transformer signal and interface 2012 are exposed from a sealed housing of the motor controller, and the motor controller 20 is mounted on the motor reducer assembly by means of a motor rear end cover 2018, that is, by means of four fixing bolts including a bolt A B1, a bolt B B2, a bolt C_B3 and a bolt D_B4, so as to achieve non-exposed connection. The motor controller-side three-phase copper bar 2011, a three-phase copper bar 2015 of the electric motor, and the motor controller-side temperature and rotary transformer signal and interface 2012 are all in non-exposed connection inside the motor rear end cover.

Figure 7:
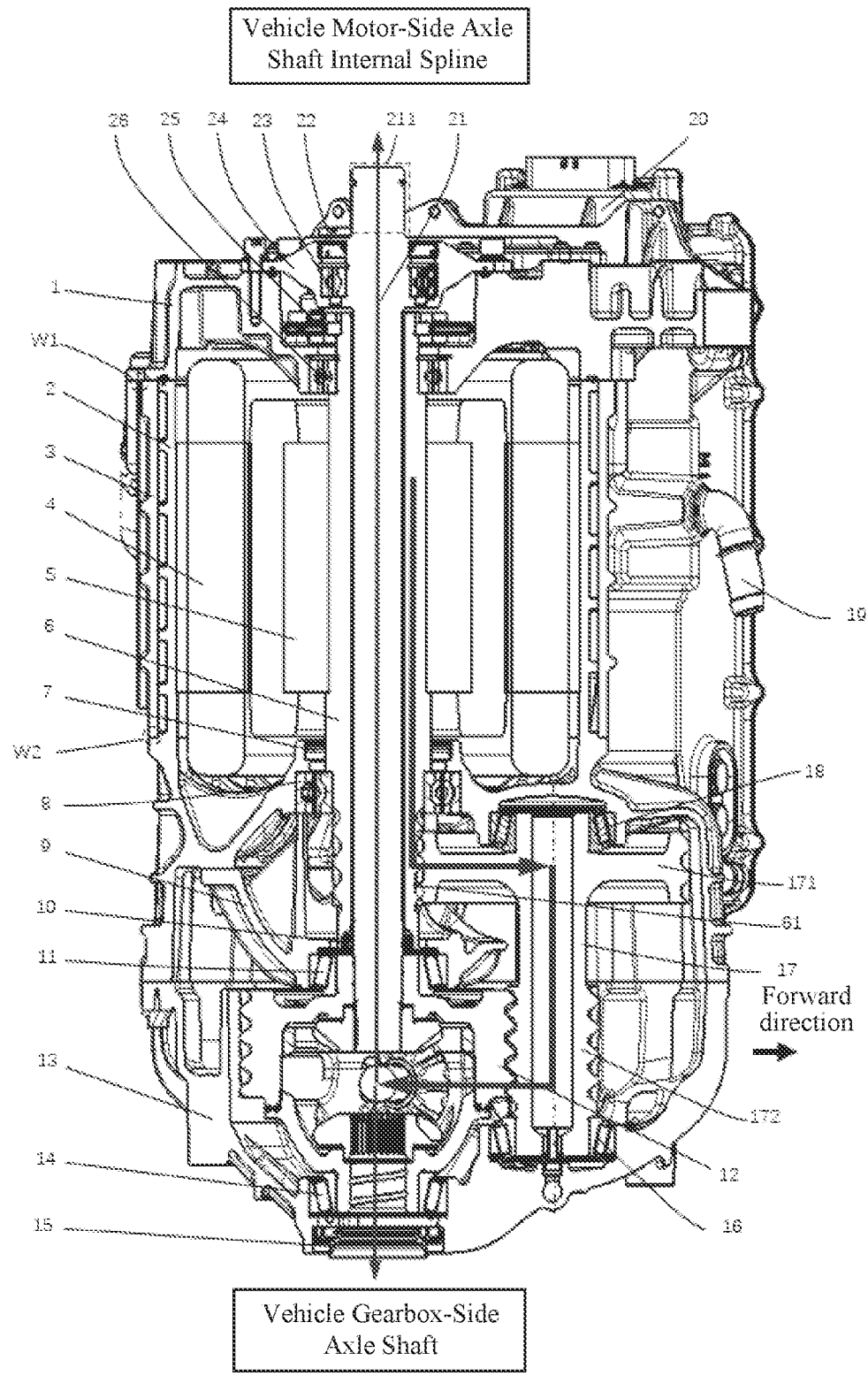
FIG. 7 is a detailed view of the disclosure.

As shown in FIG. 7, the disclosure provides a coaxial asynchronous motor drive system, comprising: a motor rear end cover 1, a main housing 2, a motor water channel shell 3, a stator assembly 4, a cast-aluminum rotor 5, a hollow motor shaft 6, a gear 61 on the hollow motor shaft, a high-speed oil seal A 7, a high-speed bearing 8, a differential carrier 9, a high-speed oil seal B_10, a differential cone bearing A 11, an integral differential 12, a gearbox casing cover 13, a differential cone bearing B_14, a gearbox-side output oil seal 15, a first intermediate shaft cone bearing A 16, an intermediate shaft assembly 17, an intermediate shaft assembly primary driven gear 171, an intermediate shaft assembly secondary driving gear 172, a second intermediate shaft cone bearing B_18, a motor controller water inlet 19, a motor controller 20, a motor-side short axle shaft 21, an external spline and retaining ring 211 on an exposed end of the motor-side short axle shaft, a motor-side output oil seal 22, a motor-side short axle shaft support bearing 23, a motor-side short axle shaft bearing block 24, a rotary transformer assembly 25, a motor rear end high-speed bearing 26, an end face friction stir welding seam W1, and an annular friction stir welding seam W2.

The motor rear end cover 1 and the main housing 2 assembly are connected together by means of bolts, the end face friction stir welding seam W1 and the annular friction stir welding seam W2 are used between the main housing 2 and the motor water channel shell 3 to form the main housing 2, and the stator assembly 4 is pressed into the main housing 2 in an interference-fit manner.

The hollow motor shaft 6 is pressed into the cast-aluminum rotor 5 in an interference-fit manner, an outer ring of the high-speed oil seal A 7 is sealed against the main housing 2 in an interference-fit manner and is rotatably sealed against the hollow motor shaft 6, the differential carrier 9 is fixed on the main housing 2 by means of a bolt, one side thereof presses the outer ring of the high-speed bearing 8 to limit the bearing, the outer ring of the high-speed oil seal 2 is sealed against the hollow motor shaft 6 in an interference-fit manner, the oil seal rotates together with the hollow motor shaft 6, and an inner side of the oil seal is rotatably sealed against the motor-side short axle shaft 21; the outer ring of the differential cone bearing A 11 is mounted in a bearing block hole of the differential carrier 9, supporting one side of the differential; a secondary driven gear of the integral differential 12 is directly machined integrally with a differential housing on one side, and is laser-welded to a differential housing on the other side after a differential gear system is assembled, and an outer ring of the differential cone bearing B 14 is mounted in a bearing block hole of the gearbox casing cover 13, supporting one side of the differential; the gearbox-side output oil seal 15 is rotatably sealed against a vehicle axle shaft internal joint, and the intermediate shaft assembly 17 is supported on the gearbox casing cover 13 and the main housing 2 by means of the first intermediate shaft cone bearing A 16 and the second intermediate shaft cone bearing B_18, respectively; the motor-side short axle shaft 21 is connected to a differential axle shaft gear spline and is rotatably sealed against the high-speed oil seal B_10, and is supported on the motor-side short axle shaft bearing block 24 by means of the motor-side short axle shaft support bearing 23; the motor-side output oil seal 22 is mounted on the motor-side short axle shaft bearing block 24, and an inner side thereof is rotatably sealed against the motor-side short axle shaft 21; and a stator of the rotary transformer assembly 25 is fixedly mounted on the motor-side short axle shaft bearing block 24, and a rotor thereof is mounted on the hollow motor shaft 6.

EXAMPLES

The motor controller 20 converts a direct current into a three-phase alternating current required by an asynchronous motor 100 to drive an motor rotor, and then a torque is output from the gear 61 on the hollow motor shaft and transferred to the intermediate shaft assembly primary driven gear 171 which meshes with the gear 61 on the hollow motor shaft, so as to achieve a first torque rise for the torque via a primary gear pair; the torque is transferred to the meshed integral differential 12 via the intermediate shaft assembly secondary driving gear 172 of the intermediate shaft assembly 17, so as to achieve a second torque rise for the torque via a secondary gear pair; and then the torque is output to the two sides via the integral differential 12. Since the integral differential 12 of the disclosure and the asynchronous motor 100 are on the same axis, the motor-side short axle shaft 21 is used, with one side thereof being connected to the differential axle shaft gear spline, and the other side thereof passing through the motor rotor and provided, at an exposed end thereof, with a motor-side short axle shaft exposed end external spline and retaining ring 211 for connection to the internal spline of the vehicle motor-side axle shaft internal joint and for axial limiting; and the vehicle gearbox-side axle shaft internal joint uses a conventional external spline, and is directly inserted into the integral differential 12 for connection to the axle shaft gear and limiting.

Comparative Experimental Data

| Dimension | The disclosure | Parallel-shaft structure |
|---|---|---|
| L1 | <210 mm | 200-210 mm |
| L2 | <143 mm | 145-155 mm |
| L3 | <331 mm | 450-470 mm |
| L31 | <188 mm | 320-350 mm |
| L32 | <143 mm | 145-155 mm |
| L4 | <520 mm | 480-500 mm |

The above-described embodiment is merely illustrative of the technical concepts and features of the disclosure, and is intended to enable those skilled in the art to understand the disclosure to implement it on this basis, and is not intended to limit the scope of protection of the disclosure. Any equivalent changes and modifications made in accordance with the spirit and essence of the disclosure should be within the scope of protection of the disclosure.

The foregoing description is merely the preferred embodiment of the disclosure and is not intended to limit the disclosure, and various changes and modifications may be made by those skilled in the art. Any modifications, equivalent substitutions, improvements, etc. made within the spirit and principles of the disclosure are intended to be included within the scope of protection of the disclosure.

The invention claimed is:

1. A coaxial asynchronous motor drive system, comprising a speed reducer, an electric motor and a main housing, and further comprising a motor controller, wherein the electric motor and the speed reducer are connected to form a motor reducer assembly and mounted inside the main housing, and the motor controller is fixed to the main housing and connected to the motor reducer assembly;

an input shaft and an output shaft of the speed reducer are in a line, and a speed reducer input gear is provided on a hollow motor shaft of the electric motor; and the electric motor controller controls to drive the gear on the hollow motor shaft of the electric motor to mesh with an intermediate shaft assembly to transfer an increased torque to an integral differential, and the torque is output to two sides via the integral differential, with a differential axle shaft gear spline on one side thereof for connection to a vehicle gearbox-side axle shaft, and a differential axle shaft gear spline on the other side thereof being connected to a short axle shaft which passes through a motor rotor and which is provided with a spline and retaining ring at a motor exposed end for connection to a vehicle motor-side axle shaft internal spline, the input shaft of the speed reducer is the hollow motor shaft, and the output shaft of the speed reducer is the differential axle shaft, wherein the main housing is provided with a rear suspension screw set, a front suspension screw set, a motor-side front suspension screw set, and a motor-side rear suspension screw set.

2. The coaxial asynchronous motor drive system according to claim 1, wherein the intermediate shaft assembly is supported on a gearbox casing cover and a main housing assembly via a first intermediate shaft cone bearing and a second intermediate shaft cone bearing.

3. The coaxial asynchronous motor drive system according to claim 1, wherein the differential axle shaft gear spline is connected to a motor-side short axle shaft.

4. The coaxial asynchronous motor drive system according to claim 3, wherein the motor-side short axle shaft is rotatably sealed against a high-speed oil seal.

5. The coaxial asynchronous motor drive system according to claim 3, wherein the motor-side short axle shaft is supported on a motor-side short axle shaft bearing block via a motor-side short axle shaft support bearing.

6. The coaxial asynchronous motor drive system according to claim 1, wherein the rear suspension screw set is configured to mount a gearbox-side proximal differential suspension bracket of the system.

7. The coaxial asynchronous motor drive system according to claim 1, wherein the front suspension screw set is configured to mount a gearbox-side distal differential suspension bracket of the system.

8. The coaxial asynchronous motor drive system according to claim 1, wherein the side front suspension screw set is configured to mount a motor-side front suspension bracket of the system.

9. The coaxial asynchronous motor drive system according to claim 1, wherein the motor-side rear suspension screw set is configured to mount a motor-side rear suspension bracket of the system.

10. The coaxial asynchronous motor drive system according to claim 1, wherein a water inlet nozzle of the motor controller located on the main housing and a motor water outlet nozzle are on the same side.

11. The coaxial asynchronous motor drive system according to claim 1, wherein in the motor controller, a motor controller-side three-phase copper bar and a motor controller-side temperature and rotary transformer signal and interface are exposed from a sealed housing of the motor controller, and the motor controller is mounted on the motor reducer assembly via four fixing bolts on a motor rear end cover.

12. The coaxial asynchronous motor drive system according to claim 1, wherein a distance between a top of the motor controller and a center of a circle of a gearbox-side output end is not more than 210 mm.

13. The coaxial asynchronous motor drive system according to claim 12, wherein the distance between the center of a circle of the gearbox-side output end and the bottom of the main housing is not more than 143 mm.

14. The coaxial asynchronous motor drive system according to claim 12, wherein the distance between the center of a circle of the gearbox-side output end and an end of the main housing in a forward direction is not more than 188 mm.

15. The coaxial asynchronous motor drive system according to claim 14, wherein the distance between the center of a circle of the gearbox-side output end and an end of the main housing in a direction opposite to the forward direction is not more than 143 mm.

16. The coaxial asynchronous motor drive system according to claim 12, wherein the distance between the center of a circle of the gearbox-side output end and a motor-side output end is not more than 520 mm.

\* \* \* \* \*